United States Patent [19]

Gerlach

[11] Patent Number: 4,601,086

[45] Date of Patent: Jul. 22, 1986

[54] METHOD OF MANUFACTURING TOP STOP-TYPE FUEL INJECTOR

[75] Inventor: Fritz L. Gerlach, Charlotte, N.C.

[73] Assignee: Cummins Atlantic, Inc., Charlotte, N.C.

[21] Appl. No.: 661,249

[22] Filed: Oct. 15, 1984

[51] Int. Cl.[4] ........................ B23P 13/00; B21K 1/20; B21K 21/16; F02M 47/02

[52] U.S. Cl. ............................ 29/156.4 R; 29/157 C; 29/401.1; 239/1; 239/88

[58] Field of Search ..................... 239/1, 5, 88, 89, 90, 239/91, 92, 124, 125, 533.3-533.12; 29/156.4, 157 C, 401.1

[56] References Cited

FOREIGN PATENT DOCUMENTS

| | | | |
|---|---|---|---|
| 483093 | 7/1953 | Italy | 239/533.3 |
| 558403 | 1/1944 | United Kingdom | 239/533.3 |

*Primary Examiner*—Andres Kashnikow
*Assistant Examiner*—Patrick N. Burkhart
*Attorney, Agent, or Firm*—W. Thad Adams, III

[57] ABSTRACT

A top stop-type fuel injector (10″) for an internal combustion engine is disclosed. A pressure-time-delivery injector body (11″), barrel (12″) and cup (13″) are positioned in end-to-end relation. A retainer (14″) extends around the barrel and secures the barrel (12″) and cup (13″) to the injector body (11″). A plunger (25″) is positioned for restrictive movement within a plunger bore (24″). A return spring (29″) is mounted within the upper end of the injector body (11″) in concentric relation to the plunger (25″). A portion of the upper end of the injector body (11″) is cut away to provide more room for adjustment of the injector (10″). External threads (80A) are formed on the remaining upper end of the injector body (11″) adjacent the free end thereof. A collar (82) having mating internal threads (81) is mounted on the upper end of the injector body (11″). A top stop (37″) is threadingly mounted within the collar (82) for adjustable positioning relative to the return spring (29″) and plunger (25″) to arrest the plunger (25″) at a predetermined upper extent of travel.

1 Claim, 4 Drawing Figures

PRIOR ART

METHOD OF MANUFACTURING TOP STOP-TYPE FUEL INJECTOR

TECHNICAL FIELD AND BACKGROUND OF THE INVENTION

The invention disclosed in this application relates to fuel injectors for internal combustion engines, specifically for Cummins diesel engines of the general type used in large trucks and construction equipment.

For many years, injectors of the general type known as "pressure-time-delivery" (PTD) injectors have been used in diesel engines of the type described above. These PTD-type injectors are simple and reliable, but do not provide precise control of the fuel injection process. This is because the plunger is limited in its downward movement when fuel is actually being injected into the cylinder, but not in its upward movement. The plunger and the return spring communicate through the upper end of the injector body into contact with the cam drive either directly or through a suitable linkage. Therefore, the PTD-type injector plunger is permitted free movement in its return stroke, subject only to limitations imposed by the cam linkage.

It has been observed for many years that the lack of precise adjustment in the upward direction of movement of the plunger results in fuel dribbling through the fuel sac holes between injections. This causes wasted fuel and smoking. In addition, overrun of the plunger to its top position, if not precisely adjusted, can cause exhaust gases to be forced into the injector through the sac holes. These extremely hot gases are then carbonized on the interior walls of the injector, causing fouling of the injector and premature wear and replacement.

Because of these problems, a new type of injector, called a "Top Stop-Type" injector has been developed. This type of injector gives much better emission control because the plunger is pre-set and does not require further adjustment in the engine. Fuel can be controlled more directly and more precisely and fuel dribbling between injections is therefore minimized or eliminated. As a result of the development of the top stop-type injector, the old, open top PTD-type injectors are no longer being installed in most new Cummins engines. Furthermore, as existing engines are overhauled, PTD injectors are being replaced with new, top stop injectors.

However, new top stop injectors are very expensive and add substantially to the overhaul costs of an engine when they are substituted for the old PTD-type injector.

In addition, replacement of PTD-type injectors with top stop injectors has created a vast supply of old PTD injector cores which are no longer suitable for use and therefore have little or no market value. Therefore, the invention disclosed in this application is directed to a means by which obsolete PTD-type injectors can be remanufactured into top stop injectors for a fraction of the cost of new top stop injectors, simultaneously reducing the cost of converting to the more efficient injectors while making use of a large supply of otherwise useless PTD injectors.

SUMMARY OF THE INVENTION

Therefore, it is an object of the invention to provide a top stop-type fuel injector for an internal combustion engine which is remanufactured from an old pressure-time-delivery fuel injector.

It is another object of the present invention to provide a method for manufacturing a top stop fuel injector for an internal combustion engine from a pressure-time-delivery fuel injector.

It is still another object of the present invention to provide a modified PTD fuel injector which provides a means of arresting the plunger at a precise point in its return travel, thereby controlling fuel usage more precisely and preventing fuel dribbling between injections which improves emission levels of the engine.

It is yet another object of the present invention to provide a modified PTD injector which provides a means for arresting the plunger at a precise point in its return travel in order to prevent exhaust gases from being forced into the injector through the sac holes and being carbonized on the interior walls of the injector.

These and other objects and advantages of the present invention are achieved in a preferred embodiment disclosed below by providing a top stop fuel injector for an internal combustion engine which includes a PTD injector body, barrel and cup positioned in end-to-end relation, with a retainer extending around the barrel and securing the barrel and cup to the injector body. A plunger bore is defined by the inner walls of the injector body, barrel and cup and a plunger is positioned for restrictive movement within the bore. A return spring is mounted within the upper end of the injection body remote from the cup in concentric relation to the plunger. In accordance with the invention, external threads are formed on the upper end of the injector body adjacent the free end thereof. A collar having mating internal threads is mounted on the upper end of the injector body and a top stop device is threadingly mounted within the collar for adjustable positioning relative to the return spring and plunger. The plunger is arrested at the predetermined upper extent of its travel by engagement of the return spring against the top stop.

A method is disclosed for manufacturing a top stop fuel injector for an internal combustion engine from a PTD fuel injector of the type having an injector body, barrel and cup positioned in end-to-end relation with a retainer extending around the barrel and securing the barrel and cup to the injector body. A plunger bore is defined by the inner walls of the injector body, barrel and cup and a plunger is positioned for restrictive movement within the bore. A return spring is mounted within the upper end of the injector body remote from the cup in concentric relation to the plunger. The method according to the invention includes the steps of forming external threads on the upper end of the injector body adjacent the free end thereof, and mounting a collar having mating internal threads on the upper end of the injector body. A top stop device is threadingly mounted within the collar for adjustable positioning relative to the return spring and plunger. The top stop device is adjusted to arrest the plunger at a predetermined upper extent of travel, thereby permitting more precise fuel metering while at the same time preventing fuel dribbling and exhaust gases from being forced into the sac holes of the injector between injections.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 2:
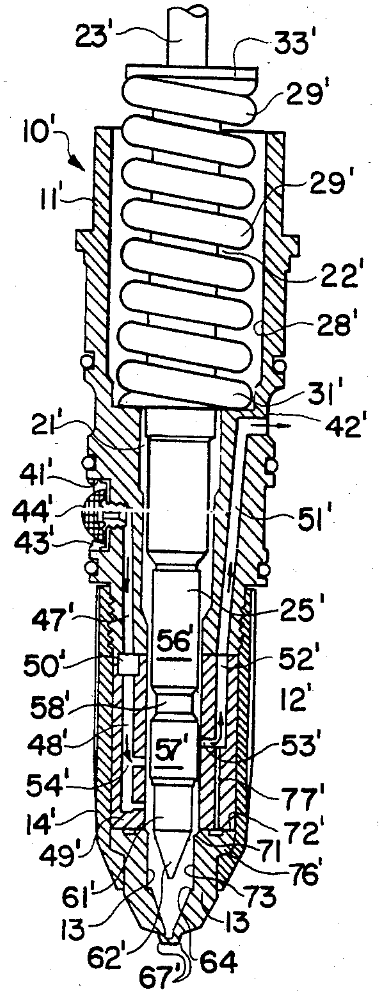
FIG. 2 is a cross-sectional view of an obsolete pressure-time-delivery fuel injector of the type from which the top stop injector according to this invention is manufactured.

Referring now specifically to the drawings, a top stop injector of the type newly manufactured for use in Cummins diesel engines is shown in cross-section. The top stop injector 10 includes an injector body 11, barrel 12 and cup 13 positioned in end-to-end relation. A retainer 14 extends around the barrel 12 and secures the cup and barrel 12 to body 11. One or more dowels (not shown) may be provided between body 11 and barrel 12 to properly orient the fuel flow passages as described below in these two parts. Injector body 11 has a generally round tubular shape with a central hole 21 formed in it which receives a sleeve 22 and link 23. Barrel 12 and cup 13 each have a plunger bore 24 which receives a plunger 25. The lower end of sleeve 22 is secured to the upper end of plunger 25 by crimping 26, and sleeve 22 extends from plunger 25 upwardly to adjacent the upper end of body 11. Link 23 extends through sleeve 22 and engages a socket 27 formed in the upper end of plunger 25. Therefore, a downward force on link 23 is transferred directly to the upper end of plunger 25.

A return spring 29 is mounted in an enlarged area of hole 21. The lower end of return spring 29 is positioned on a ledge 31 and the upper end of spring 29 engages a washer 32. The washer 32 is held between the upper end of the spring 29 and a flange 33 on the upper end of sleeve 22. The return spring 29 therefore urges washer 32, sleeve 22 and link 23 upwardly, thereby moving plunger 25 also upwardly. The upper end of the injector body 11 is internally threaded as indicated at 36 and a top stop 37 is threaded into injector body 11. A lock nut 38 secures top stop 37 at a selected position. Top stop 37 overlies washer 32 and forms a stop which limits the upward movement of washer 32 and the other parts connected to it.

Injector body 11 is provided with a fuel inlet groove 41 and a drain groove 42 in its outer periphery. The injector is designed for installation in an engine wherein the head (not shown) has a common fuel supply rail and a common return rail formed in it. The two rails connect with grooves 41 and 42. A fuel supply opening 43 is formed in injector body 11 and opens into supply groove 41. In addition, a metering plug 44 is mounted in opening 43 and a screen 46 is preferably provided over opening 43 to prevent impurities from entering the injector.

A fuel supply passage 47 extends from the opening 43 and longitudinally downwardly within the injector body 11 to its lower end. At the upper end of barrel 12 is formed another fuel supply passage 48, including a check value 50 which permits the flow of fuel only in the direction that is away from opening 43. Supply passage 48 in barrel 12 extends to a point which is spaced from the interface 72 between cup 13 and barrel 12. A radial metering orifice 49 connects the lower end of the supply passage 48 to the plunger bore 25 in barrel 12.

Return groove 42 connects with a drain passage 51 which is formed longitudinally in injector body 11 from groove 42 downwardly to the lower face of injector body 11. A connecting drain passage 52 is formed in barrel 12 and communicates with a drain port 53 that opens into the plunger bore 24. A scavenge port 54 is connected to supply passage 48. Ports 53 and 54 are displaced upwardly in the direction of the injector body 11 from metering orifice 49.

Plunger 25 includes two running surfaces 56 and 57 which have a close sliding fit with the bore surface. Clearances between the bore surface and plunger 25 are greatly exaggerated in the drawings. The two running surfaces 56 and 57 are separated by a scavenging groove 58 formed in plunger 25. The two ports 53 and 54 are axially separated and groove 58 has an axial dimension sufficiently long to connect the two ports 53 and 54 when plunger 25 is in the downwardly displaced position.

The lower end of plunger 25 has a reduced diameter portion 61 and a cone portion 62 formed at its lower end. Cup 13 has a chamber formed by a cylindrical upper part 63 and a cup seat 64. The cylindrical portion 63 has a slighly larger diameter than the minor diameter part 61 of plunger 25 and cone 62 is shaped to mate with the cup seat 64. At the lower end of cup 13 are formed a plurality of sac holes 67 through the walls thereof which connect the interior chamber of cup 13 with the engine combustion chamber.

A control edge 71 is formed where the lower running surface 57 meets the reduced diameter portion 61 of plunger 25. The part of bore 24 below the control edge 71 forms a fuel injection chamber 73 which is bounded by surfaces of cup 13, the lower end of barrel 12 and the exterior surface of plunger 24 below control edge 71.

An annular groove 76 is formed at interface 72 in the upper surface of cup 13. A restricted diameter bleed valve 77 is longitudinally formed in barrel 12 which connects groove 76 with drain passage 52. Passage 77 permits any leakage accumulated in groove 76 to the drain 52. The particular type of top stop injector disclosed above is that shown in U.S Pat. No. 4,280,659.

Figure 1:
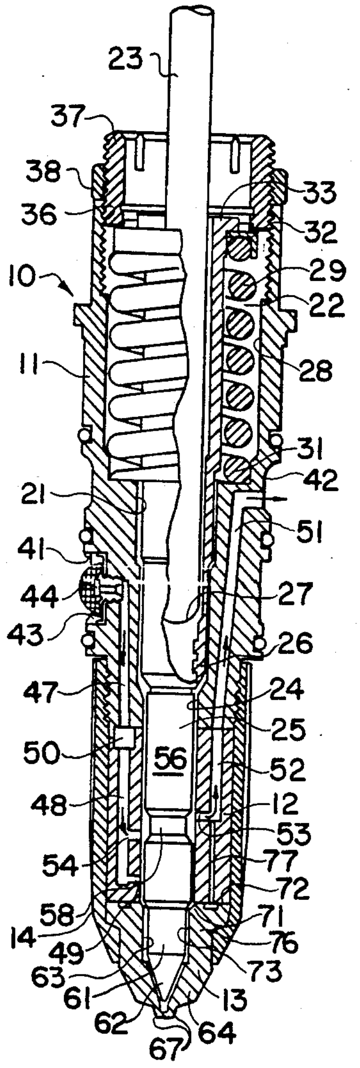
PRIOR ART FIG. 1
FIG. 1 is a vertical, cross-sectional view, with parts broken away, of a top stop injector of conventional, new manufacture.

Referring now to FIG. 2, a prior art PTD injector is shown and illustrated at reference numeral 10'. There are many particular types of PTD injectors, all of which may differ slightly in detail. For reasons of brevity, many of the particular features shown in FIG. 1 are also shown with reference to PTD injector 10' in FIG. 2. Like or equivalent elements are shown in FIG. 2 in prime notation. It will be understood that numerous types of PTD injectors are usable in the practice of this invention which may differ in some respects from the one shown hypothetically in FIG. 2.

Note in FIG. 2, that injector 11' is not internally threaded to receive a top stop, and therefore link 23' and return spring 29' are free for unrestricted movement upwardly and outwardly out of hole 21.

Figure 3:
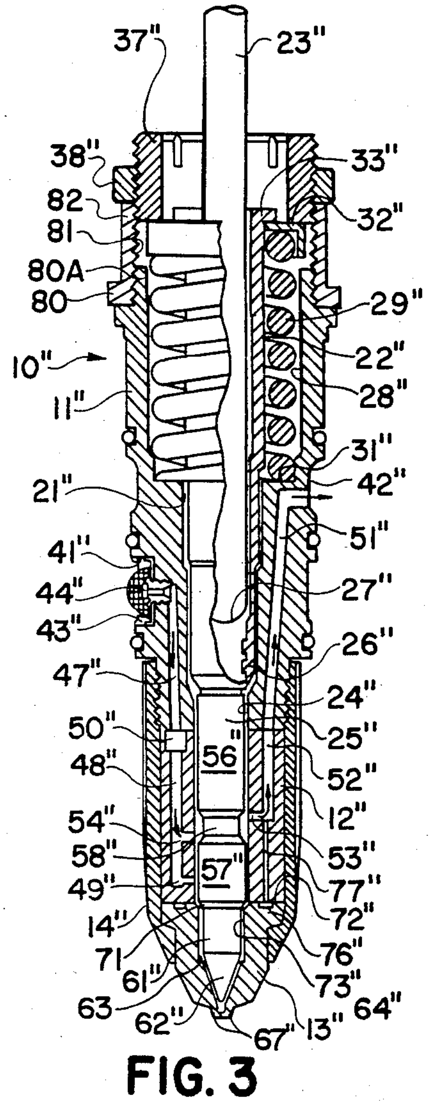
FIG. 3 is a vertical, cross-sectional view, with parts broken away, of a top stop injector manufactured from the obsolete PTD injector shown in FIG. 2.
Figure 4:
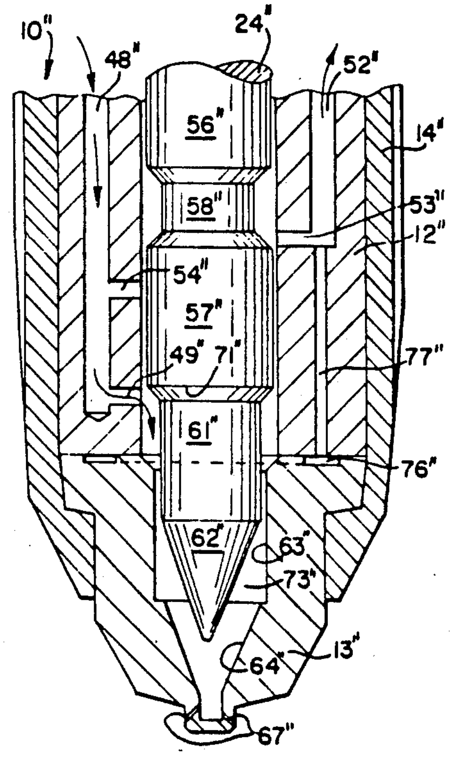
FIG. 4 is an enlarged, fragmentary view of the lower end of the injector 10" shown in FIG. 3.

Referring now to FIG. 3, the PTD injector 10' shown in FIG. 2 has been modified to form a top stop injector 10" which will function like the top stop injector 10 shown in FIG. 1, but at greatly reduced costs. Again, like elements in FIGS. 2 and 3 are shown in prime and double prime notation for purposes of brevity. Still referring to FIG. 3, injector body 11" has been modified as follows. First, approximately 3/10 of one inch (0.75 centimeters) is cut from the top of injector body 11". The remaining outer surface of injector body 11" down to an outwardly extending, annular shoulder 80 is threaded with threads 80A. An annular collar 82, having mating internal threads 81 is screwed onto the upper end of injector body 11" down to a tight, press fit with shoulder 80. Washer 32" is positioned to top return spring 29" and now is urged into contact with the bottom, downwardly extending surface of top stop 37" which is threaded onto threads 81 of annular collar 82. Locking nut 38" is then threaded onto the threads of top stop 37" and screwed downwardly into tight locking position against the upper surface of collar 82. This locks top stop 37 into a precisely adjustable position.

Therefore, the PTD injector has now been converted into a more efficient but low cost top stop injector.

A top stop-type fuel injector for an internal combustion engine and a method of manufacturing a top stop fuel injector for an internal combustion engine from a pressure-time-delivery fuel injector are disclosed above. Various details of the invention may be changed without departing from its scope. Furthermore, the foregoing description of a preferred embodiment of the invention is provided for the purpose of illustration and not for the purpose of limiting invention being defined by the claims.

I claim:

1. A method of manufacturing a top stop fuel injector for an internal combustion engine from a pressure-time-delivery fuel injector of the type having a pressure-time-delivery injector body which includes an annular shoulder for seating the injector against the engine head, a barrel and cup positioned in end-to-end relation, a retainer extending around the barrel and securing the barrel and cup to the injector body, a plunger bore defined by inner walls of the injector body, barrel, and cup, a plunger positioned for restrictive movement within said bore for generation injection pressure within said injector from a relatively low delivery pressure and a return spring mounted within the upper end of the injector body remote from the cup in concentric relation to the plunger, the method comprising the steps of:

(a) reducing the length of the injector body above the shoulder;

(b) forming external threads on the remaining upper end of the injector body above the shoulder adjacent the free end thereof;

(c) mounting a collar, having mating internal threads, on the upper end of the injector body; and (d) threadingly mounting a top stop within said collar for adjustable positioning relative to said return spring and plunger to arrest the plunger at a predetermined upper extent of travel.

* * * * *